United States Patent
Biblarz

[11] 4,315,169
[45] Feb. 9, 1982

[54] STAIRCASE ELECTRODE-WALL CONFIGURATION FOR MHD GENERATORS

[75] Inventor: Oscar Biblarz, Carmel, Calif.

[73] Assignee: The United States of America as represented by the Secretary of the Navy, Washington, D.C.

[21] Appl. No.: 92,298

[22] Filed: Nov. 8, 1979

[51] Int. Cl.³ .............................................. H02K 45/00
[52] U.S. Cl. ................................................... 310/11
[58] Field of Search ........................................ 310/11

[56] References Cited

U.S. PATENT DOCUMENTS

| | | | |
|---|---|---|---|
| 2,558,816 | 7/1951 | Bruynes | 138/37 |
| 3,261,993 | 7/1966 | Keating, Jr. | 310/11 |
| 3,406,300 | 10/1968 | Teno et al. | 310/11 |
| 3,428,835 | 2/1969 | Dzung | 310/11 |
| 3,660,701 | 5/1972 | Blattmann et al. | 310/11 |
| 3,854,061 | 12/1974 | Rosa | 310/11 |

Primary Examiner—Donovan F. Duggan
Attorney, Agent, or Firm—R. S. Sciascia; Charles D. B. Curry; Francis I. Gray

[57] ABSTRACT

A staircase electrode-wall configuration for a MHD generator which uses fluid dynamic means to protect the electrodes from substantial damage due to arcing and chemical attack. The electrode walls of a MHD generator duct have periodic conductor/insulator elements where channel divergence or convergence is accomplished in a stepwise fashion. The electrode is situated within the insulator of each element to be backward-facing so as not to be directly exposed to the hot gas flow. The turbulence which exists at the backward-facing electrode moves the arc spot about the surface to prevent severe local damage. Chemical attack is inhibited by a laminated electrode surface of a low corrosive material and the turbulence which aids in cooling the electrode face. Additional cooling may be obtained by a purge jet at the electrode face.

9 Claims, 2 Drawing Figures

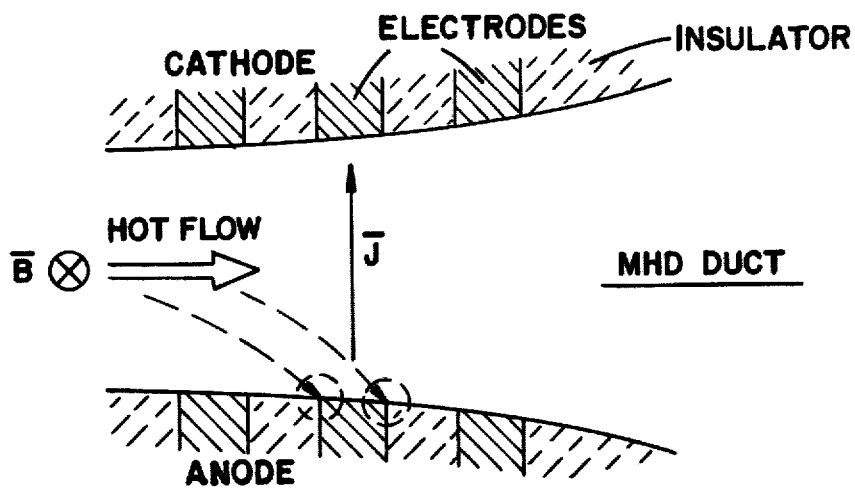
FIG_1 (PRIOR ART)
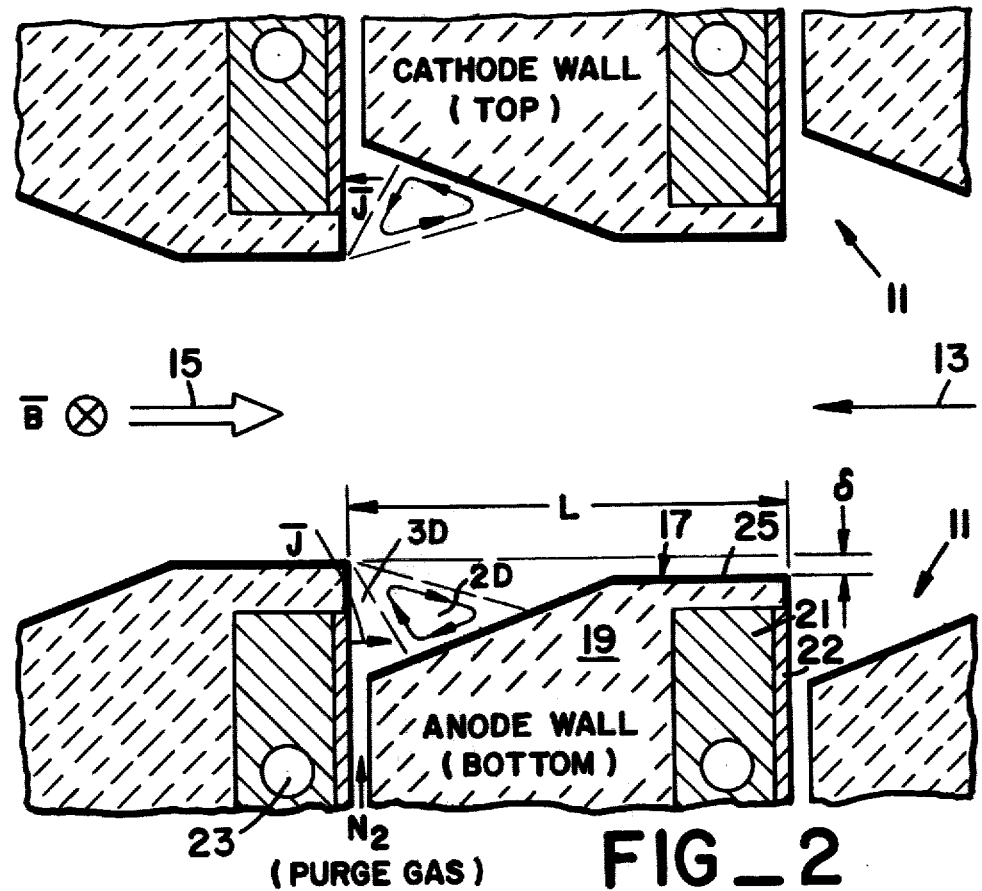
FIG_2

STAIRCASE ELECTRODE-WALL CONFIGURATION FOR MHD GENERATORS

BACKGROUND OF THE INVENTION

1. Field of the Invention

The present invention relates to magnetohydrodynamic (MHD) generators, and more particularly to a staircase electrode-wall configuration for MHD generators.

2. Description of the Prior Art

MHD power generation is of interest for the production of large amounts of electricity. However, MHD generators have a limited lifetime due to electrode-wall erosion which hampers their practical application. The electrodes function in a high temperature, corrosive environment, resulting in chemical reactions, arc spots, etc. which erode and otherwise cause failure to the electrodes. This necessity to prolong electrode and insulator lifetimes in the MHD generator environment has resulted in a variety of electrode-wall designs (see for example Heywood and Womak, *Open—Cycle MHD Power Generation*, Chapter 7, Pergamon Press, Oxford 1969).

A typical electrode-wall configuration is shown in FIG. 1 where the electrodes alternate with insulators, with the electrode face flush with the inner wall of the MHD duct. The current, $\bar{J}$, flows from the anode to the cathode in the presence of the magnetic field, $\bar{B}$, and the hot gas flow. The current causes arc spots at the cathode, particularly, and together with the turbulent hot flow this results in chemical reactions at the electrode/insulator interfaces which erode the electrodes. Also, the hot plasma may deposit seed or slag which disrupts the electrode function.

SUMMARY OF THE INVENTION

Accordingly, the present invention provides a staircase electrode-wall configuration for MHD generators which uses fluid dynamic means to protect the electrodes from substantial damage due to arcing, seed deposition and chemical attack. The electrode walls of a MHD generator duct have periodic conductor/insulator elements where duct divergence or convergence is attained in a stepwise fashion. The backward-facing step element contains the electrode within the insulator so the electrode is not directly exposed to the hot gas flow. The electrode is water-cooled copper with a laminated stainless steel face. A purge jet may be introduced at the electrode face between conductor/insulator elements.

Therefore, it is an object of the present invention to provide an electrode configuration for a MHD generator which has a practical lifetime for high power applications.

Another object of the present invention is to substantially reduce arc spot damage to the electrode face.

Yet another object of the present invention is to provide increased resistance of the electrodes to chemical attack.

Other objects, advantages and novel features of the present invention will be apparent from the following detailed description when read in conjunction with the appended claims and attached drawing.

BRIEF DESCRIPTION OF THE DRAWING

FIG. 1 is a schematic diagram of a prior art MHD generator electrode configuration.

FIG. 2 is a schematic diagram of a staircase electrode-wall configuration according to the present invention.

DESCRIPTION OF THE PREFERRED EMBODIMENT

Referring to FIG. 2 a portion of the electrode wall 11 of a MHD generator duct 13 is shown. A strong magnetic field, $\bar{B}$, is applied, shown going into the plane of the drawing, and a hot gas flow 15 flows axially along the duct 13 as indicated. A plurality of conductor/insulator elements 17 are arranged in the electrode wall 11 in a periodic configuration in such a manner as to accomplish divergence (or convergence) of the duct 13 in a stepwise fashion. Each element 17 has an insulator portion 19 with a slope at the upstream end and a sharp step at the downstream end. An electrode portion 21 is embedded within the downstream portion of the insulator portion 19 such that the electrode portion is flush with the vertical wall and is not in the direct path of the hot gas flow 15. Successive downstream elements 17 are offset from each other by a step height, $\delta$, to form the staircase configuration.

Based upon backward-facing step studies, the step-depression-to-reattachment-point ratio is typically one to seven for turbulent boundary layers. A three-dimentional region, 3D, exists next to the vertical wall of the step followed by a two-dimentional recirculation region, 2D. The current flow between the cathode and the anode, as indicated by the current vector, $\bar{J}$, causes arc spots at the surface of the electrode portion 21. Due to the 3D flow in this region these arc spots can be moved about the surface, thereby preventing severe local damage such as pitting.

In many MHD-duct configurations, the $\bar{J} \times \bar{B}$ force due to axial currents drives any existing arcs into the wall at the anode and away from the wall at the cathode. Under the present invention bouyant and convective forces would drive the arc up away from the walls at the anode surface. Thus a dynamic force balance is possible which also causes the arc spots to move about the surface. At the cathode the buoyant force acts also up, but both the $\bar{J} \times \bar{B}$ force and the convective force act down so that a force balance there is also feasible. For space applications buoyancy would not be a factor and the relative orientation (top-bottom) of the electrode wall is not significant. The convective forces and the $\bar{J} \times \bar{B}$ forces remain, however, and may still be used to maintain the dynamic force balance.

The removal of the electrode portion 21 from direct contact with the hot gas flow 15 together with the turbulence at the surface result in a cooler electrode portion 21 than in prior art configurations, providing increased resistance to chemical attack. Additionally, cooling ducts 23 through the electrode portion 21 serve to cool the electrode portion. Finally, a purge jet of inert gas, such as $N_2$, at the surface, or face, of the electrode portion 21 may be used to further cool and keep deposits away from the electrode portion so long as it does not disrupt the recirculation pattern in the backward-facing step or adversely affect the electrical conductivity of the region.

The insulator portion 19 may be a castable ceramic, such as alumina, with a glazed outer surface 25 to prevent or delay seed permeation from shorting out the axial electric field. Also, non-porous ceramics which resist chemical attack and thermal shock may be used. The electrode portion 21, which is typically water-cooled copper, may have a laminated stainless steel face 22 for additional chemical stability. The stainless steel face 22, being harder than copper, also resists arc spot damage, but the thickness must not be such as to significantly affect the current flow between cathode and anode and the plasma.

The step height, δ, is a function of the dimension, L, of the electrode element 17 in the flow direction. These dimensions are arrived at from considerations of the electrode segmentation required, the boundary layer thickness, etc. The electrodes may also be offset as in the diagonal wall duct.

Thus, the present invention provide a geometrical arrangement between the hot gas flow, the magnetic field and the electrode configuration which provides a cooler electrode with the cold surface not directly exposed to the hot gas flow and with more insulator between electrodes to reduce chemical attack, and which provides a recirculation area which constantly moves the arc spot on the electrode surface to prevent severe local damage.

What is claimed is:

1. An electrode configuration for an MHD generator in which a hot plasma flows along a duct having opposing electrode walls, said hot plasma being subjected to a strong magnetic field, comprising a plurality of periodic electrode elements forming said electrode walls, each of said electrode elements being in the form of a backward-facing step having an insulator portion and an electrode portion, said electrode portion being situated so as not to be directly exposed to said hot plasma and so as to have the electric field generated coact with said magnetic field to essentially balance the convection force at the exposed surface of said electrode portion, and each of successive ones of said electrode elements along the axis of said hot plasma flow being offset to form a steplike divergence for said duct.

2. An electrode configuration as recited in claim 1 wherein each of said electrode elements comprise:
   (a) an insulator portion having a slope portion and a backward-facing step portion; and
   (b) an electrode portion being situated in said backward-facing step portion so as not to be directly exposed to said hot plasma.

3. An electrode configuration as recited in claim 2 wherein said electrode portion comprises:
   (a) a highly electrically conductive portion having a cooling duct passing therethrough; and
   (b) a laminate of a high strength non-corrosive material to form the face of said electrode, the thickness of said laminate being such as to not significantly impede the flow of current between said opposing electrode walls.

4. An electrode configuration as recited in claim 3 further comprising means for introducing a purge jet of inert gas at said electrode face without disturbing the recirculation area formed by said hot plasma flow at said backward-facing step.

5. In an MHD generator of the type in which a hot plasma flows along a duct having opposing electrode walls through a strong magnetic field, an improved electrode arrangement for forming said walls, which comprises:
   (a) a plurality of periodic electrode elements with each electrode element being in the form of a backward-facing step and having an insulator portion and a conductor portion;
   (b) said conductor portion being embedded in said insulator portion so that only a single surface of said conductor portion is uninsulated and uncovered, said uncovered surface being on the downstream end of said element, facing downstream, and oriented normal to the longitudinal axis of said duct;
   (c) said insulator portion having an upward sloping surface extending from the upstream end of said element to a surface parallel to the longitudinal axis of the duct, said parallel surface extending to the downstream end of said electrode element;
   (d) said electrode elements being arranged to provide a step-depression from the backward-facing surface of the upstream electrode element to the upward sloping surface of the downstream electrode element; and
   (e) said arrangement thereby providing that said conductor portion is not directly exposed to said hot gas flow and also providing a turbulent region of three dimensional flow and a recirculation region two-dimensional flow formed by said hot gas flow downstream of the step-depression.

6. The electrode arrangement as recited in claim 5 wherein successive electrode elements are offset to form steplike changes in the opposing electrode walls.

7. The electrode arrangement as recited in claim 5 wherein successive electrode elements are offset to form a steplike divergence in said opposing electrode walls.

8. An electrode arrangement as recited in claim 5 wherein said conductor portion includes:
   (a) a cooling duct passing therethrough; and
   (b) a laminate of a high strength non-corrosive material to form the uncovered face of said conductor portion, the thickness of said laminate being such as to not significantly impede the flow of current between said opposing electrode walls.

9. An electrode arrangement as recited in claims 5 or 7 further including means for introducing a purge jet of inert gas at said conductor surface without disturbing the recirculation region formed downstream of the step-depression.

* * * * *